(12) United States Patent
Yang

(10) Patent No.: US 7,947,389 B2
(45) Date of Patent: May 24, 2011

(54) CARTRIDGE FRAME WITH CONNECTORS FOR BATTERY PACK

(75) Inventor: Jae Hun Yang, Daejeon (KR)

(73) Assignee: LG Chem, Ltd. (KR)

( * ) Notice: Subject to any disclaimer, the term of this patent is extended or adjusted under 35 U.S.C. 154(b) by 265 days.

(21) Appl. No.: 11/565,742

(22) Filed: Dec. 1, 2006

(65) Prior Publication Data

US 2007/0124980 A1 Jun. 7, 2007

(30) Foreign Application Priority Data

Dec. 2, 2005 (KR) .................. 10-2005-0116658

(51) Int. Cl.
*H01M 6/42* (2006.01)
*H01M 6/46* (2006.01)
*H01M 10/058* (2006.01)

(52) U.S. Cl. ......... 429/159; 429/151; 429/170; 429/155

(58) Field of Classification Search .................. 429/96, 429/99, 100, 159; 180/68.5; 206/703–705; 29/730–731; 903/903, 907
See application file for complete search history.

(56) References Cited

U.S. PATENT DOCUMENTS

| | | | | |
|---|---|---|---|---|
| 5,496,657 | A | * | 3/1996 | Dixon, Jr. .................. 429/62 |
| 5,662,497 | A | * | 9/1997 | Reilly .................. 439/627 |
| 2004/0016455 | A1 | * | 1/2004 | Oogami .................. 136/244 |
| 2004/0157117 | A1 | * | 8/2004 | Tamaki et al. .................. 429/99 |
| 2005/0100783 | A1 | * | 5/2005 | Ro et al. .................. 429/159 |
| 2005/0123828 | A1 | * | 6/2005 | Oogami et al. .................. 429/152 |

FOREIGN PATENT DOCUMENTS

KR 10-2004-0111699 6/2006

* cited by examiner

*Primary Examiner* — Keith Walker
(74) *Attorney, Agent, or Firm* — Cantor Colburn LLP

(57) ABSTRACT

Disclosed herein is a battery cartridge for middle- or large-sized battery packs, which has one or more unit cells mounted therein. The battery cartridge is generally constructed in a plate-shaped structure for easy stacking, and connecting members for electrical connection between cartridges are constructed in a coupling structure in which the connecting members are coupled with each other during the stacking of the cartridges. When a plurality of cartridges are stacked one on another so as to construct a middle- or large-sized battery pack, the mechanical coupling between the cartridges is accomplished, and, at the same time, the electrical connection between the cartridges is also accomplished, whereby the assembly of the cartridges is easily accomplished, and the risk of short circuits is prevented during the assembly or the use of the cartridges. Furthermore, a middle- or large-sized battery pack manufactured using the battery cartridge according to the present invention has a stable compact structure. Consequently, the middle- or large-sized battery pack is preferably used as a power source for electric vehicles or hybrid electric vehicles.

12 Claims, 8 Drawing Sheets

Prior Art

CARTRIDGE FRAME WITH CONNECTORS FOR BATTERY PACK

FIELD OF THE INVENTION

The present invention relates to a cartridge for middle- or large-sized battery pack, and, more particularly, to a battery cartridge having one or more unit cells mounted therein so as to construct a middle- or large-sized battery pack wherein members for accomplishing the electrical connection between cartridges are constructed in a coupling structure, whereby the assembly of the cartridges is easily accomplished, the electrical connection between the cartridges is accomplished without using bus bars, and the risk of short circuits due to the exposure of terminals is prevented.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or in parallel with each other so as to construct a medium- or large-sized battery pack.

Meanwhile, prismatic batteries or pouch-shaped batteries, which can be stacked one on another to reduce the size of a dead space, are used as the unit cells, which are components of the medium- or large-sized battery pack. In order to easily accomplish the mechanical coupling and the electrical connection between the unit cells, a cartridge, in which one or more unit cells are mounted, is used. Specifically, a plurality of cartridges, in which the unit cells are mounted, are stacked one on another so construct a battery pack.

The cartridge may have various shapes. In addition, the cartridge may be constructed in a structure in which the unit cells are fixed to a frame member while most of the outer surfaces of the unit cells are open. An example of such a cartridge is disclosed in Korean Patent Application No. 2004-111699, which has been filed in the name of the applicant of the present patent application. FIG. 1 illustrates the cartridge disclosed in the above-mentioned application.

Referring first to FIG. 1, a cartridge 100 comprises a pair of frame members 120 and 122, which are coupled with each other. Unit cells 200 and 201 are located in cell partitions 130 of the frame members 120 and 122 while the frame members 120 and 122 are separated from each other, and are then securely fixed at the cell partitions 130 of the frame members 120 and 122 after the frame members 120 and 122 are coupled with each other. The unit cell 200 has an electrode lead (not shown), which is electrically connected to that of the neighboring unit cell 201 via a bus bar 140 located at the upper part of the cartridge 100. As shown in FIG. 1, the unit cells 200 and 201 are connected in series with each other. According to circumstances, however, the unit cells may be connected in parallel with each other. The unit cells are electrically connected to a cathode terminal 150 and an anode terminal 160, which protrude from opposite sides of the upper end of the cartridge 100, respectively.

FIG. 2 is a perspective view illustrating a battery module, which is used to manufacture a middle- or large-sized battery pack, constructed by stacking a plurality of battery cartridges one on another in an alternating orientation structure.

Referring to FIG. 2, a plurality of cartridges 101, 102, 103 . . . are stacked one on another in the thickness direction so as to construct a battery module 300. To easily accomplish the electrical connection between the terminals of the cartridges, the second cartridge 102 is stacked on the first cartridge 101 while the second cartridge 102 is oriented in the direction opposite to the orientation direction of the first cartridge 101. Specifically, the first cartridge 101 and the second cartridge 102 are arranged such that a cathode terminal 152 and an anode terminal 162 of the second cartridge 102 are opposite to a cathode terminal 151 and an anode terminal 161 of the first cartridge 101. Similarly, the second cartridge 102 and the third cartridge 103 are arranged such that a cathode terminal 153 and an anode terminal 163 of the third cartridge 103 are opposite to the cathode terminal 152 and the anode terminal 162 of the second cartridge 102. That is to say, the third cartridge 103 is arranged in the same orientation as the first cartridge 101.

As shown in FIG. 1, the height of an upper end frame 110 and a lower end frame 112 of the cartridge 100 is less than that of side frames 114 of the cartridge. Consequently, when the cartridges 101, 102, 103 . . . are stacked one on another as shown in FIG. 2, flow channels 170, 171, 172, and 173 are formed in spaces defined between the upper ends of the cartridges 101, 102, 103 . . . and the lower ends of the neighboring cartridges. As a result, a coolant flows in the direction indicated by an arrow.

The advantage of the structure in which the cartridges are arranged in the alternating orientation as shown in FIG. 2 is that the distance between the connecting terminals for electrical connection is increased by the thickness of one cartridge, and therefore, it is possible to easily accomplish the connection between the connecting terminals using bus bars as compared with the structure in which the connecting terminals (the cathode terminals and the anode terminals) are in the same orientation.

However, the battery module has several problems as follows.

First, it is necessary to accurately stack the cartridges one on another so as to construct the battery module, and therefore, the assembly process is difficult and troublesome. Since each cartridge is generally constructed in the rectangular structure, and no additional regions or members for coupling the cartridge with each other are included while the cartridges are stacked one on another so as to construct the battery module, it is necessary to perform an accurate positioning operation along with the stacking operation. When the cartridges are not stacked one on another at accurate positions, the electrical connection between the connecting terminals may be difficult, or the connection state between the connecting terminals may be poor.

Second, it is difficult to accomplish the electrical connection between the connecting terminals of the cartridges. In order to accomplish the electrical connection between the connecting terminals of the cartridges, it is necessary to perform welding, soldering, or mechanical coupling using additional connecting members, for example, bus bars. The structure of the connecting members and the small distance between the connection members complicate the assembly process of the cartridges.

Third, the connecting terminals of the cartridges are exposed to the outside, and therefore, the risk of short circuits is very high during the assembly or the use of the cartridges.

Consequently, the necessity of a technology for solving the above-mentioned problems is very high.

SUMMARY OF THE INVENTION

Therefore, the present invention has been made to solve the above-mentioned problems, and other technical problems that have yet to be resolved.

Specifically, it is an object of the present invention to provide a battery cartridge constructed such that, when a plurality of cartridges are stacked one on another so as to manufacture a middle- or large-sized battery pack, the mechanical coupling between the cartridges is accomplished, and, at the same time, the electrical connection between the cartridges is accomplished, whereby the assembly process of the battery cartridges is very simplified, and the risk of short circuits is effectively prevented during the assembly and the use of the battery cartridges.

It is another object of the present invention to provide a battery module constructed using the above-described cartridge.

It is yet another object of the present invention to provide a middle- or large-sized battery pack manufactured using the above-described battery module.

In accordance with one aspect of the present invention, the above and other objects can be accomplished by the provision of a battery cartridge for middle- or large-sized battery packs, which has one or more unit cells mounted therein, wherein the battery cartridge is generally constructed in a plate-shaped structure for easy stacking, and connecting members for electrical connection between cartridges are constructed in a coupling structure in which the connecting members are coupled with each other during the stacking of the cartridges.

According to the present invention, the connecting members for electrical connection between the battery cartridges are coupled with each other. Consequently, the mechanical coupling and the electrical connection between the battery cartridges are simultaneously accomplished at the time of stacking the cartridges. Since the mechanical coupling between the battery cartridges is accomplished during the stacking of the cartridges, it is possible to easily and accurately perform the stacking operation at predetermined positions. Also, since the electrical connection between the battery cartridges is simultaneously accomplished during the stacking of the cartridges, it is not necessary to perform a welding or soldering operation using bus bars, and therefore, the assembly process is considerably simplified.

The term used in the specification "plate-shaped structure" means a structure having a large width and length to thickness ratio such that the stacking is easily accomplished. Consequently, the shape of the cartridge is not particularly restricted.

The cartridge may have various different structures. In a preferred embodiment, the cartridge includes a pair of rectangular frame members for fixing the edges of the unit cells when the rectangular frame members are coupled with each other, one or more plate-shaped unit cells are mounted between the frame members while the unit cells are arranged in the lateral direction, and bus bars for connecting electrode terminals of the unit cells are attached to an upper end frame of the battery cartridge. The fundamental structure of the cartridge is nearly identical to that of a cartridge disclosed in Korean Patent Application No. 2004-111699, which has been filed in the name of the applicant of the present application. The disclosure of the above-mentioned Korean patent application is hereby incorporated by reference as if fully set forth herein.

The connecting members according to the present invention are constructed in a structure in which the connecting members are coupled with each other during the stacking of the cartridges. Consequently, the connection members include two kinds of connecting members that can be coupled with each other. In a preferred embodiment, the connecting members include a socket type connecting member and a plug type connecting member. The socket type connecting member serves as a female coupling part, whereas the plug type connecting member serves as a male coupling part. Consequently, when these coupling members are mounted in opposite regions of two cartridges, respectively, the coupling between the coupling members is accomplished simultaneously with the stacking of the cartridges. For example, when two or more cartridges are stacked one on another while the socket type connecting member is mounted in one side of the upper end of each cartridge, and the plug type connecting member is mounted in one side of the lower end of each cartridge, the plug type connecting member (a) mounted in the lower end of the first cartridge is inserted into the socket type connecting member (b) mounted in the upper end of the second cartridge, and the plug type connecting member (b) mounted in the lower end of the second cartridge is inserted into the socket type connecting member (c) mounted in the upper end of the third cartridge.

In a preferred embodiment, the socket type connecting member is constructed in a structure in which a connection part, which is connected to an electrode terminal of the corresponding unit cell, protrudes from one side of a member body having a hollow part, and the plug type connecting member is constructed in a structure in which a connection part, which is connected to an electrode terminal of the corresponding unit cell, protrudes from one side of a member body having a protrusion part that is coupled with the hollow part. Consequently, the socket type connecting member and the plug type connecting member mounted in the different cartridges, respectively, are coupled with each other by inserting the protrusion parts of the plug type connecting member into the hollow part of the socket type connecting member.

Also, the electrical connection between the cartridges is accomplished while the connecting members are electrically connected with the electrode terminals of the unit cell. Consequently, the connecting members may be made of a conductive material, such as metal. Alternatively, at least the connection part, the hollow part, and the protrusion part may be made of a conductive material, and the connection part, the hollow part, and the protrusion part are electrically connected with each other.

The connecting members may be integrally formed with the cartridge or assembled with the cartridge. As an example of the latter case, when the cartridge includes a pair of rectangular frame members which are coupled with each other as previously described, the connecting members may be assembled with each other such that the member bodies of the connecting members are fixedly mounted between the frame members, and the protrusion part or the hollow part is exposed to the outside.

According to circumstances, frame members may be provided at either side thereof with at least one coupling protrusion, in which a through-hole is formed such that a rod-shaped coupling member, such as a fastener, can be inserted through the through-hole so as to increase the coupling force between the cartridge and other cartridges.

In accordance with another aspect of the present invention, there is provided a battery module including a plurality of battery cartridges stacked one on another.

The term used in the specification "battery module" inclusively means the structure of a battery system constructed by mechanically coupling and, at the same time, electrically connecting two or more unit cells so as to provide high-output and large-capacity electricity. Specifically, the battery module may construct either the entirety of a device or a part of a large-sized device. For example, a plurality of battery modules may be connected with each other so as to construct a battery pack.

In a preferred embodiment, the battery module having a plurality of battery cartridges stacked one on another such that the mechanical coupling and the electrical connection between the battery cartridges are accomplished through the use of the above-described connecting members may be constructed in a structure in which a cover plate, which has a shape corresponding to the cartridges, is mounted to the top of the uppermost one of the stacked battery cartridges, a base plate, which has a shape corresponding to the cartridges, is mounted to the bottom of the lowermost one of the stacked battery cartridges, and the cover plate and the base plate having a coupling groove or a coupling protrusion that can be coupled with the protrusion part or the hollow part of the connecting members and external input and output terminals that are electrically connected with the coupling groove and the coupling protrusion.

The unit cells may be secondary batteries that can be charged and discharged. Typically, the unit cells may be nickel metal hydride secondary batteries, lithium-ion secondary batteries, or lithium-ion polymer secondary batteries. Among them, the lithium-ion secondary batteries are preferably used because the lithium-ion secondary batteries have high energy density and high discharge voltage. In terms of the shape of the unit cells, prismatic batteries or pouch-type batteries are preferably used. More preferably, the pouch-shaped batteries are used because the manufacturing costs of the pouch-shaped batteries are low, and the weight of the pouch-shaped batteries small.

In accordance with yet another aspect of the present invention, there is provided a medium- or large-sized battery pack including one or more battery modules with the above-stated construction. The medium- or large-sized battery pack further includes a battery management system (BMS) for controlling the operation of the battery modules in addition to the battery modules.

The medium- or large-sized battery pack according to the present invention has a stable compact structure. Consequently, the middle- or large-sized battery pack is preferably used as a power source for electric vehicles, hybrid electric vehicles, or electric bicycles, to which a large number of external impacts are continuously applied and which the installation space for the battery pack is restricted.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
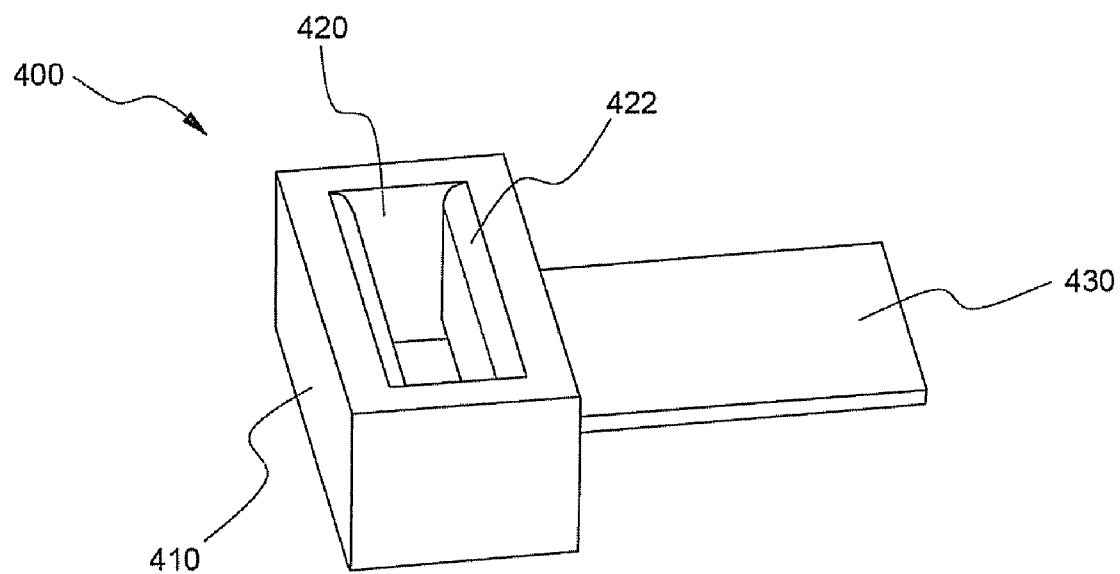
FIGS. 3 and 4 are perspective views respectively illustrating a pair of connecting members according to a preferred embodiment of the present invention.
Figure 4:
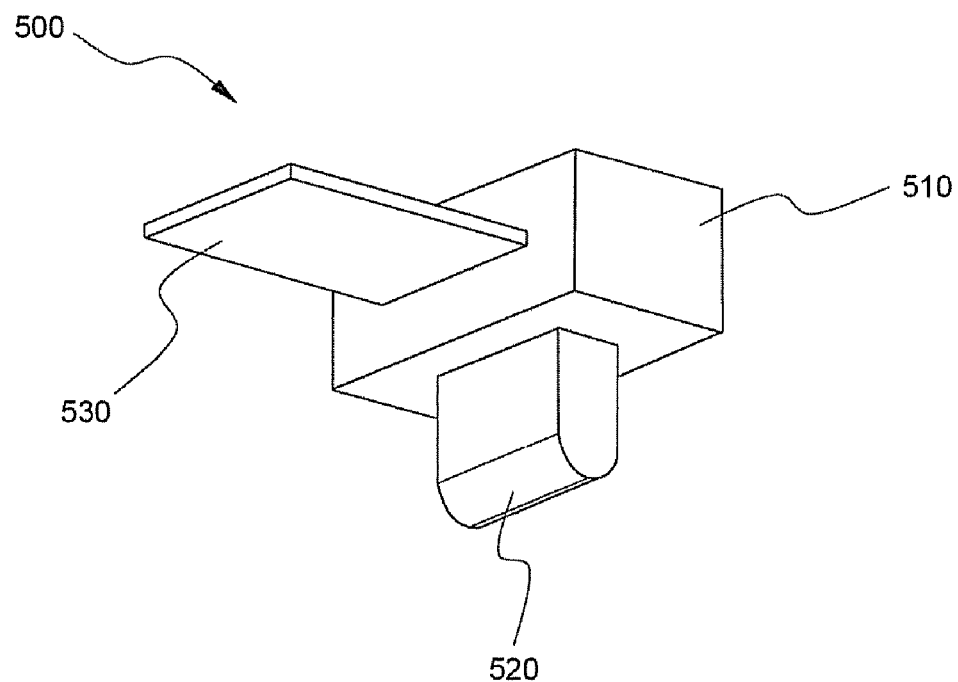

FIGS. 3 and 4 are perspective views respectively illustrating a pair of connecting members according to a preferred embodiment of the present invention.

The connecting member shown in FIG. 3 is a socket type connecting member 400 having a hollow part 420 formed through the middle of a hexahedral member body 410 and a connection part 430 protruding from one side of the member body 410. Consequently, the connecting member 400 is constructed in a symmetrical structure when viewing the horizontal section of the connecting member 400. The connection part 430 is connected with an electrode terminal of a unit cell (not shown). Also, the connection part 430 is electrically connected with an inside coupling part 422 of the hollow part 420. Consequently, the connection part 430 and the inside coupling part 422 are made of a conductive material, and the member body 410 is made of an insulating material, such as plastic resin. According to circumstances, however, the member body 410 may be made of a conductive material.

The connecting member shown in FIG. 4 is a plug type connecting member 500 corresponding to the socket type connecting member 400 of FIG. 3. The plug type connecting member 500 has a protrusion part 520 formed at the top or the bottom of a hexahedral member body 510 and a connection part 530 protruding from one side of the member body 510. The connection part 530 is connected with an electrode terminal of a unit cell (not shown). Also, the connection part 530 is electrically connected with the protrusion part 520. Consequently, the connection part 530 and the protrusion part 520 are made of a conductive material, and the member body 510 is made of an insulating material, such as plastic resin. According to circumstances, however, the member body 510 may be made of a conductive material.

Referring to both FIGS. 3 and 4, the protrusion part 520 of the plug type connecting member 500 is inserted into the hollow part 420 of the socket type connecting member 400, and is then electrically connected to the inside coupling part 422 of the hollow part 420. Consequently, the mechanical coupling and the electrical connection between the plug type connecting member 500 and the socket type connecting member 400 are simultaneously accomplished. The inside coupling part 422 and the protrusion part 520 may be constructed in various different structures to increase the coupling force when the inside coupling part 422 and the protrusion part 520 are coupled with each other.

Figure 1:
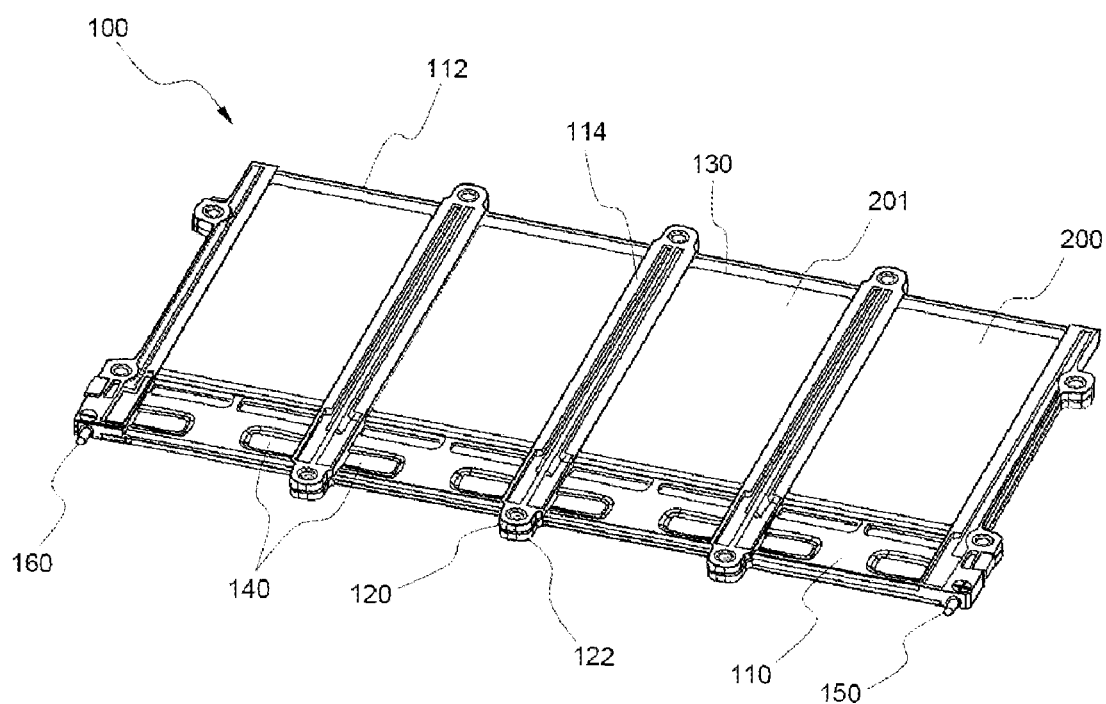
FIG. 1 is a perspective view illustrating a conventional battery cartridge.
Figure 2:
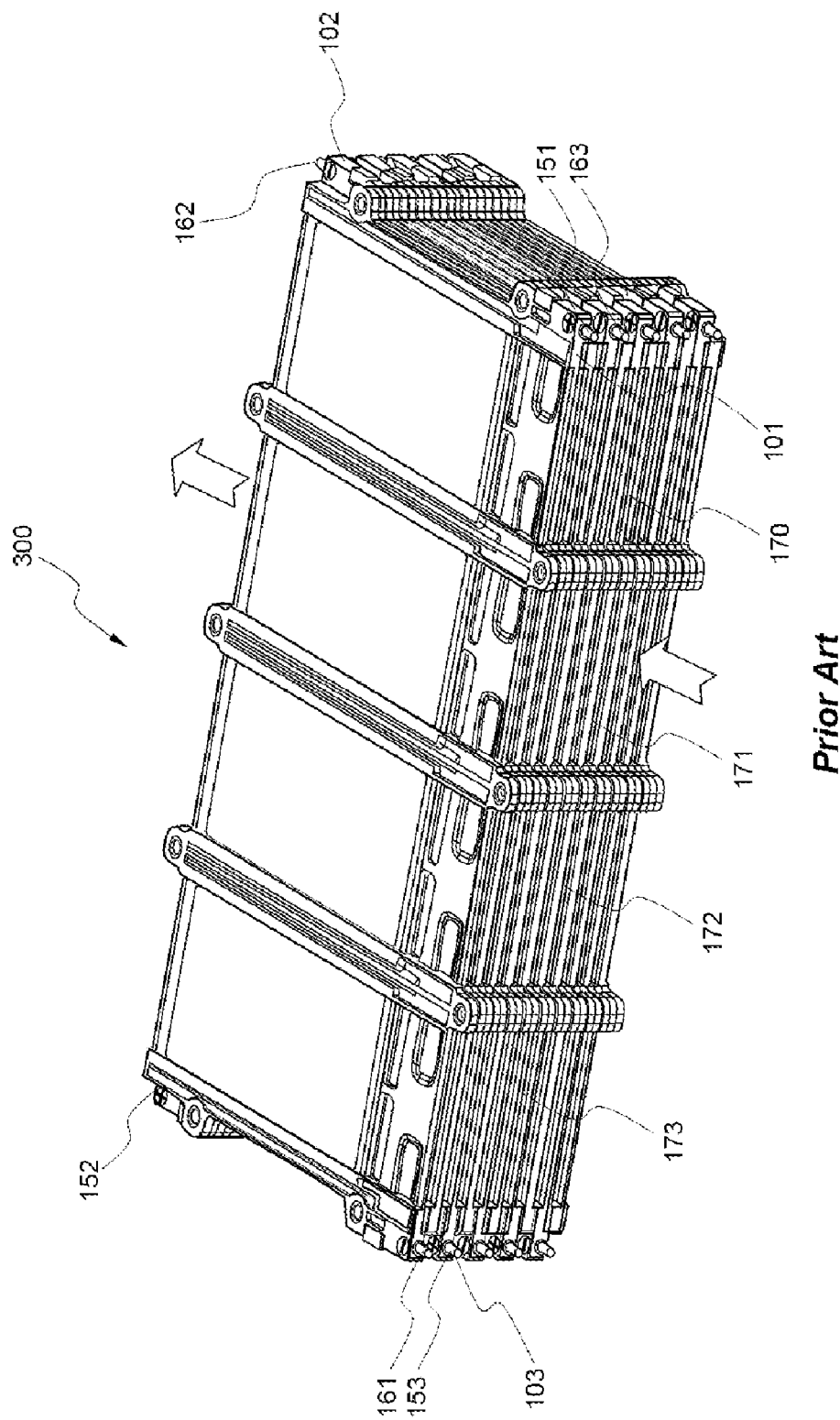
FIG. 2 is a perspective view illustrating a battery module constructed by stacking a plurality of battery cartridges, one of which is shown in FIG. 1, one on another.
Figure 5:
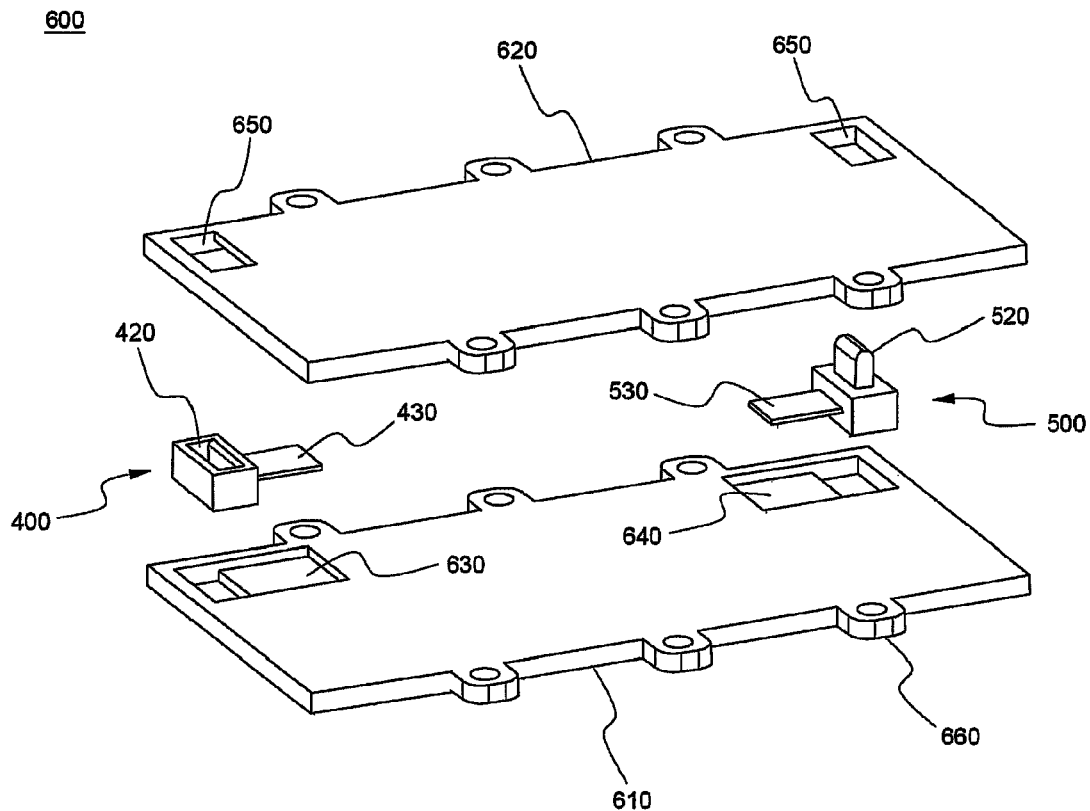
FIG. 5 is a typical view illustrating a process for mounting the connecting members of FIGS. 3 and 4 to a cartridge.

FIG. 5 is a typical view illustrating a process for mounting the connecting members of FIGS. 3 and 4 to a cartridge. For convenience of description, frame members of the cartridge of FIG. 5 are simply shown in a closed plate structure, and unit cells are omitted. However, it is also possible to manufacture the frame members in an open structure so as to easily accomplish the removal of heat generated from the unit cells through the flow of the coolant as shown in FIG. 1.

Referring to FIG. 5, a battery cartridge 600 includes a pair of frame members 610 and 620, which are coupled with each other. The lower frame member 610 is provided at opposite sides of the upper part thereof with mounting parts 630 and 640, in which the socket type connecting member 400 and the plug type connecting member 500 are mounted, respectively. The upper frame member 620 is provided at positions corresponding to the mounting parts 630 and 640 with openings 650, through which the hollow part of the socket type connecting member 400 and the protrusion part 520 of the plug type connecting member 500 are exposed.

The connection parts 430 and 530 of the socket type connecting member 400 and the plug type connecting member 500 are connected with electrode terminals of unit cells (not shown) mounted between the frame members 610 and 620 during the assembly of the frame members 610 and 620. In order to stably maintain the connection state between the connection parts 430 and 530 and the electrode terminals of the unit cells, a welding operation may be additionally performed.

At the opposite sides of the frame members 610 and 620 are formed pluralities of coupling protrusions 660, in each of which a through-hole is formed such that a fastener, such as a long screw, can be inserted through the through-hole so as to increase the coupling force between the cartridge 600 and other cartridges.

Figure 6:
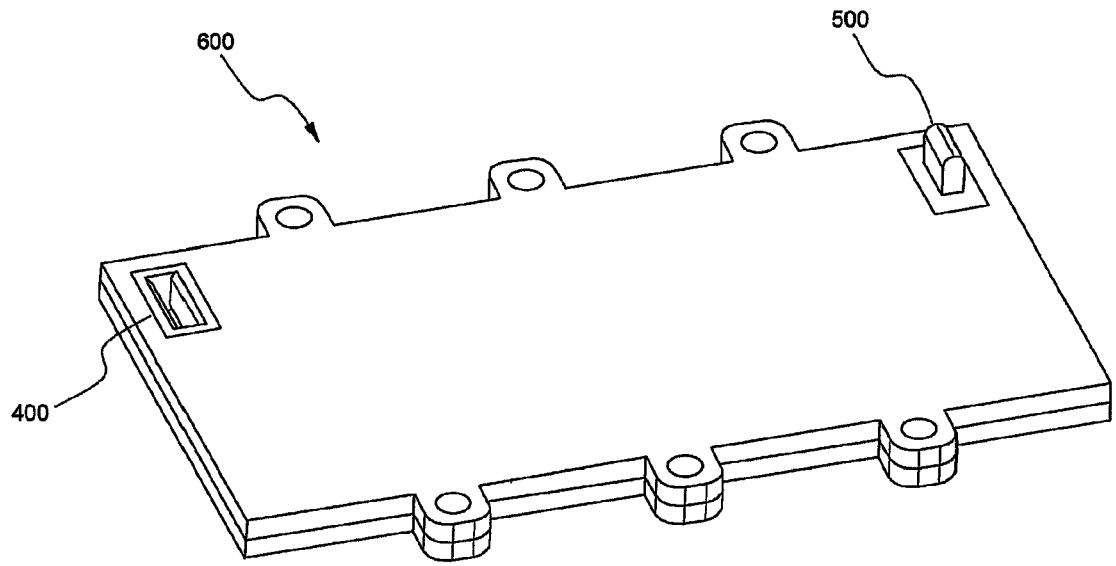
FIG. 6 is a perspective view illustrating an A type battery cartridge assembled according to the process of FIG. 5.

FIG. 6 is a perspective view illustrating an A type battery cartridge assembled according to the process of FIG. 5. Specifically, the battery cartridge 600 of FIG. 6 is constructed such that the socket type connecting member 400 is mounted in the left upper end of the battery cartridge 600, and the plug type connecting member 500 is mounted in the right upper end of the battery cartridge 600 with the protrusion part upward. Hereinafter, the battery cartridge 600 of FIG. 6 will be referred to as an "A" type cartridge.

Figure 7:
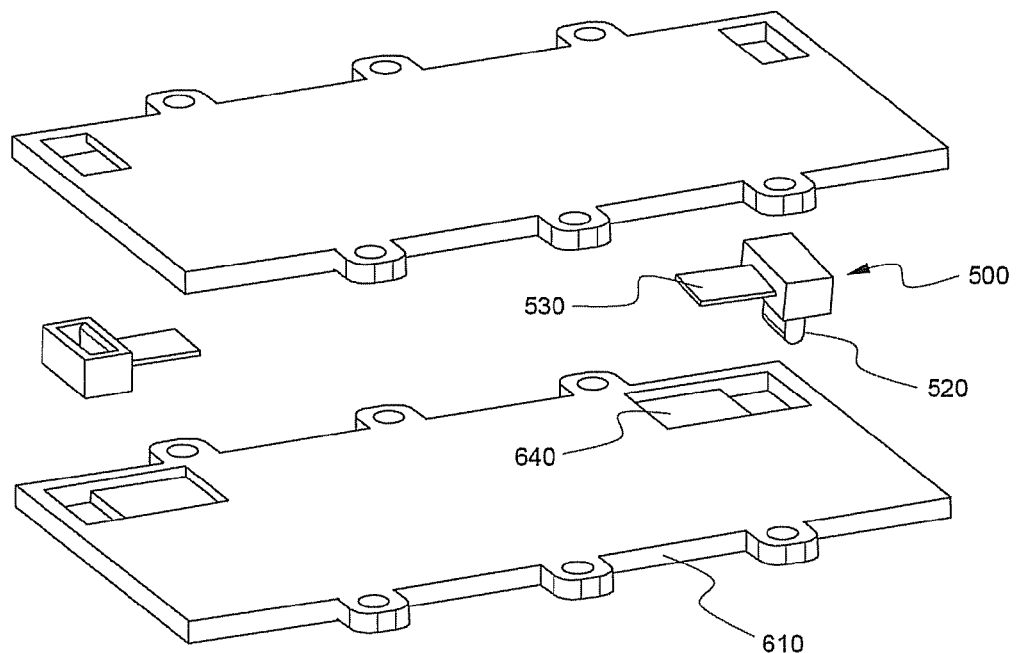
FIG. 7 is a typical view similar to FIG. 5 but illustrating a process for mounting a plug type connecting member to a frame member while the plug type connecting member is upside down.

FIG. 7 is a typical view similar to FIG. 5 but illustrating a process for mounting the plug type connecting member to the corresponding frame member while the plug type connecting member is upside down. Specifically, the upper frame member 620 is coupled with the lower frame member 610 while the plug type connecting member 500 is located at the right upper mounting part 640 of the lower frame member 610 such that the protrusion part 520 of the plug type connecting member 500 is directed downward.

Figure 8:
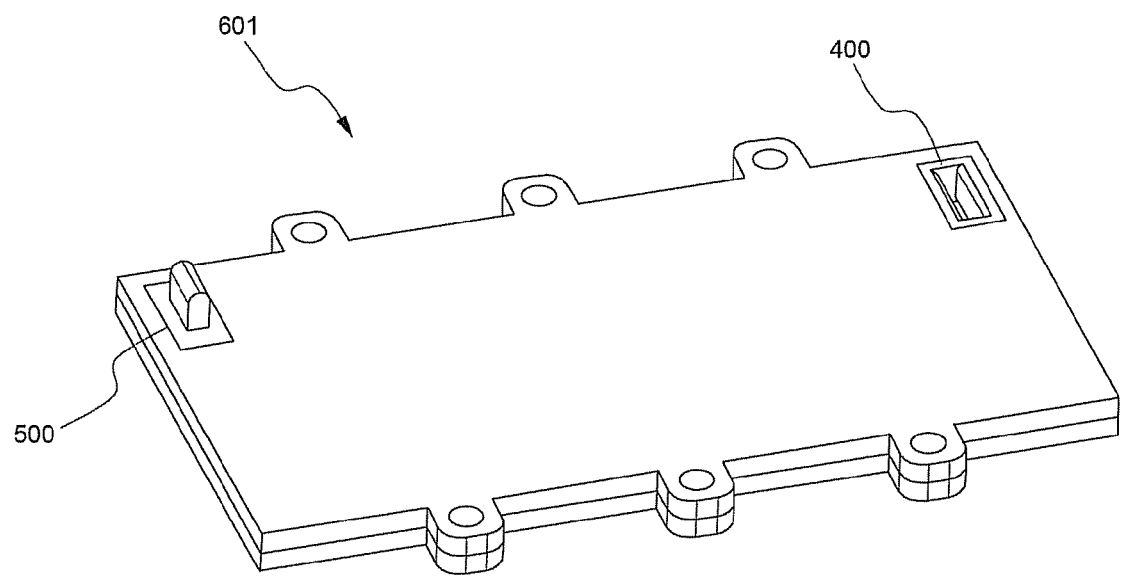
FIG. 8 is a perspective view illustrating a B type battery cartridge assembled according to the process of FIG. 7.

FIG. 8 is a perspective view illustrating a battery cartridge 601 assembled according to the process of FIG. 7. Hereinafter, the battery cartridge 601 of FIG. 8 will be referred to as a "B" type cartridge. Specifically, the B type battery cartridge 601 is constructed such that the socket type connecting member 400 is mounted in the right upper end of the battery cartridge 601, and the plug type connecting member 500 is mounted in the left upper end of the battery cartridge 601. In other words, the B type cartridge 601 is identical to the A type cartridge 600 of FIG. 6 except that the positions of the connecting members 400 and 500 are shifted. Since the socket type connecting member 400 is constructed in a vertically symmetrical structure when viewing the horizontal section of the connecting member 400, it is possible to easily manufacture the B type battery cartridge by simply turning the plug type connecting member 500 upside down and mounting the plug type connecting member 500 in the corresponding frame member as shown in FIG. 7.

As described above with reference to FIGS. 3 to 8, the socket type connecting member 400 and the plug type connecting member 500 are separately manufactured, and are then assembled with the frame members 610 and 620. According to circumstances, however, the socket type connecting member 400 and the plug type connecting member 500 may be integrally formed with the upper frame member 610 or the lower frame member 620.

Figure 9:
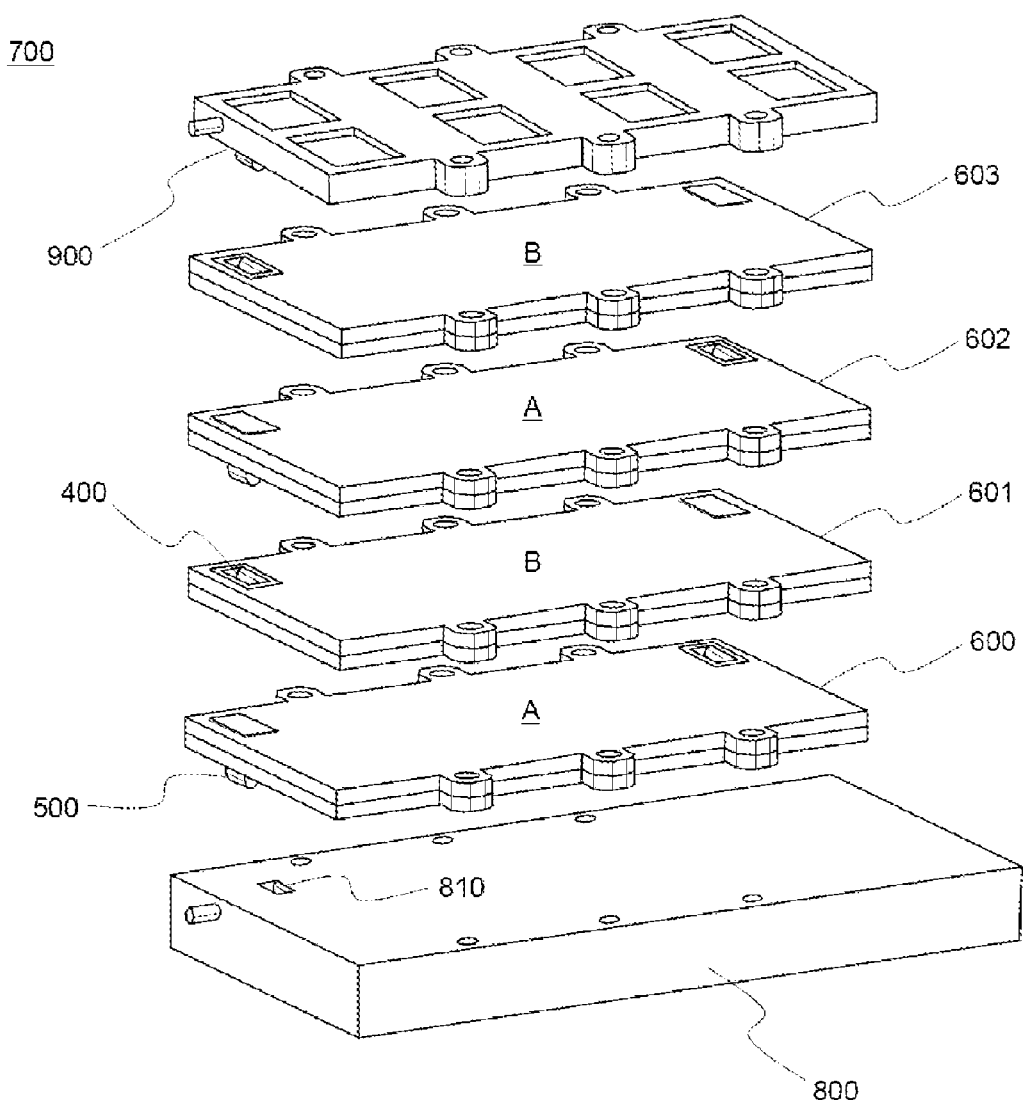
FIG. 9 is a typical view illustrating a process for stacking pluralities of A type cartridges, one of which is shown in FIG. 6, and B type cartridges, one of which is shown in FIG. 8, one on another so as to construct a battery module.

FIG. 9 is a typical view illustrating a process for stacking pluralities of A type cartridges, one of which is shown in FIG. 6, and B type cartridges, one of which is shown in FIG. 8, one on another so as to construct a battery module.

Referring to FIG. 9, a battery module 700 is constructed in a structure in which a plurality of cartridges 600 and 601 are stacked one on another on a base plate 800, and then a cover plate 900 is mounted on the top of the stacked cartridges. The details of the base plate 800 and the cover plate 900 will be described below with reference to FIGS. 10 to 12.

The stacking process of the cartridges is performed such that A type cartridges 600 and 602 and B type cartridges 601 and 603 are alternately arranged. When the base plate 800 is provided in the upper part thereof with a coupling groove 810, in which the protrusion part 520 of the plug type connecting member 500 is coupled, as shown in FIG. 9, the A type cartridge 600 is placed on the base plate 800, and the B type cartridge 601 is placed on the A type cartridge 600. When the cartridges 600, 601, 602, and 603 are sequentially stacked one on another, the socket type connecting members 400 and the corresponding plug type connecting members 500 are automatically coupled with each other. As a result, the mechanical coupling and the electrical connection between the socket type connecting members 400 and the corresponding plug type connecting members 500 are simultaneously accomplished. Consequently, it is possible to accomplish the electrical connection between the cartridges 600, 601, 602, and 603 without using additional bus bars. Furthermore, since the socket type connecting members 400 and the corresponding plug type connecting members 500 are mounted in predetermined regions of the cartridges 600, 601, 602, and 603, the stacking operation of the cartridges 600, 601, 602, and 603 is accurately carried out at predetermined positions. In addition, the connecting members 400 and 500 are isolated from the outside after the cartridges are stacked, and therefore, the risk of short circuits is prevented.

Figure 10:
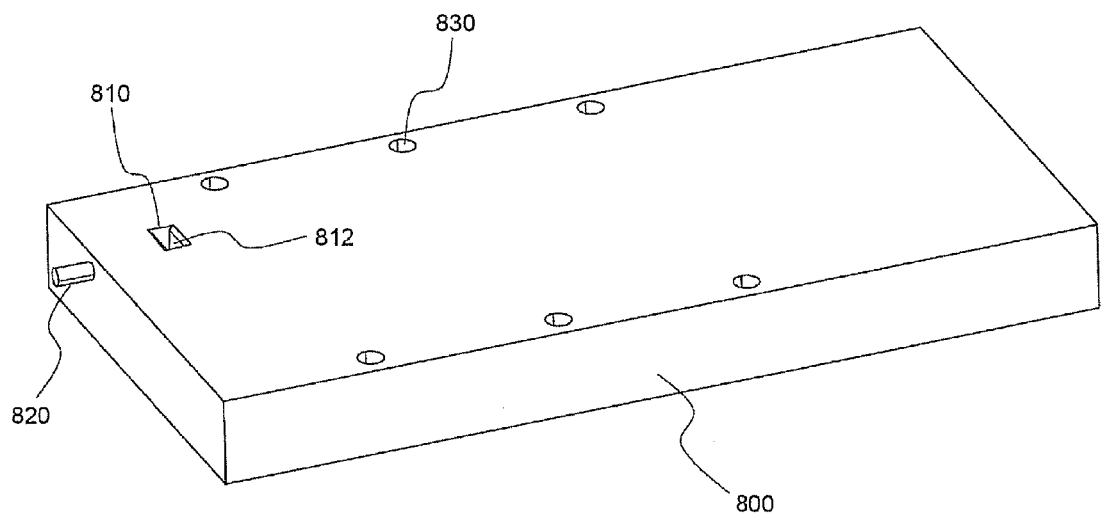
FIG. 10 is a typical view illustrating a base plate used when the battery module is constructed as shown in FIG. 9.

FIG. 10 is a typical view illustrating the base plate used when the battery module is constructed as shown in FIG. 9.

Referring to FIG. 10, the base plate 800 is generally constructed in a rectangular structure. The base plate 800 is provided in one side of the upper part thereof with a coupling groove 810. At one end of the base plate 800 adjacent to the coupling groove 810 is formed an external input and output terminal 820. The coupling groove 810 is constructed in a shape nearly corresponding to the hollow part 420 of the socket type connecting member 400 of FIG. 4. The coupling groove 810 has an inside coupling part 812 electrically connected with the external input and output terminal 820. When the cartridge (not shown) placed on the base plate 800 is the B type cartridge, a coupling protrusion is necessary instead of the coupling groove 810.

In addition, the base plate 800 is provided in opposite sides of the upper part thereof with pluralities of grooves 830, which correspond to the through-holes of the coupling protrusions 660 shown in FIG. 5. Preferably, the base plate 800 is made of an insulative member having high strength.

Figure 11:
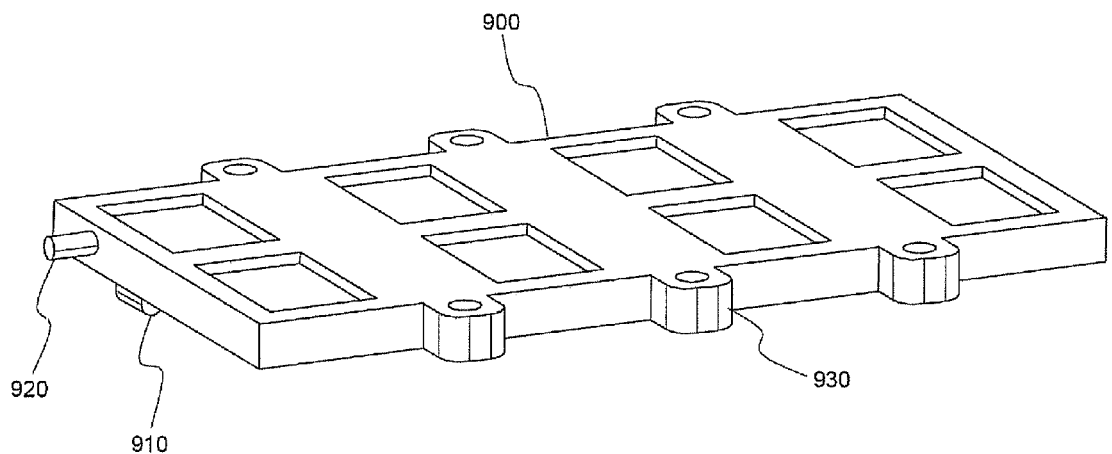
FIGS. 11 and 12 are perspective views respectively illustrating the upper and lower parts of a cover plate used when the battery module is constructed as shown in FIG. 9.
Figure 12:
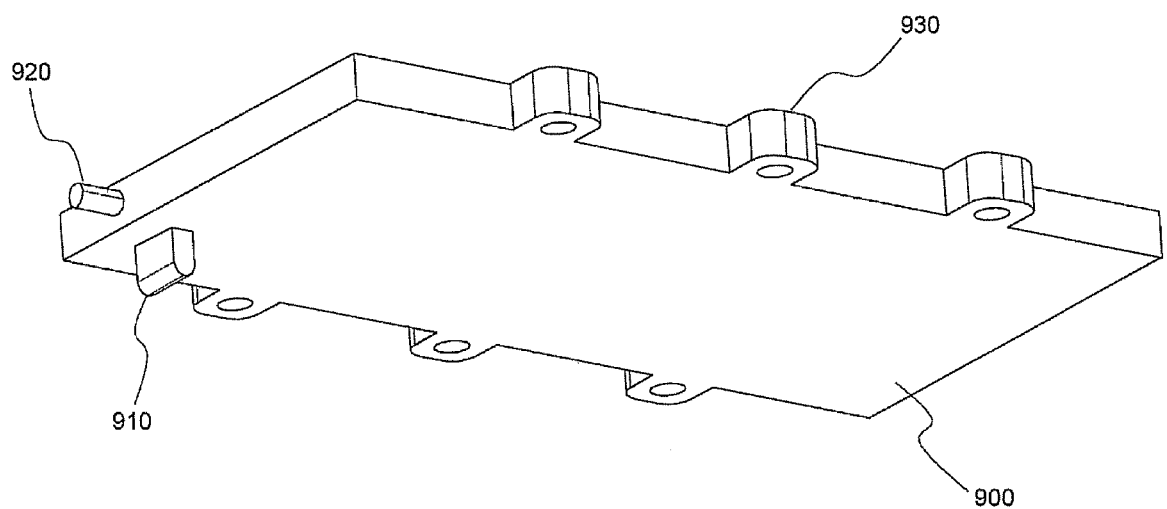

FIGS. 11 and 12 are perspective views respectively illustrating the upper and lower parts of the cover plate used when the battery module is constructed as shown in FIG. 9.

Referring to these drawings, the cover plate 900 is generally constructed in a rectangular structure having the same size as the battery cartridges. The cover plate 900 is provided at one side of the lower part thereof with a coupling protrusion 910. At one end of the cover plate 900 adjacent to the coupling protrusion 910 is formed an external input and output terminal 920. The coupling protrusion 910 is constructed in a shape nearly corresponding to the protrusion part 520 of the plug type connecting member 500 shown in FIG. 5. The coupling protrusion 910 is electrically connected with the external input and output terminal 920. When the cartridge (not shown) contacting the bottom of the cover plate 900 is the A type cartridge, the coupling groove 810 shown in FIG. 10 is formed instead of the coupling protrusion 910.

In addition, the cover plate 900 is provided at opposite sides thereof with coupling protrusions 930 having through-holes formed therethrough. Preferably, the cover plate 900 is made of an insulative member having high strength.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery cartridge according to the present invention has effects in that, when a plurality of cartridges are stacked one on another so as to construct a middle- or large-sized battery pack, the mechanical coupling between the cartridges is accomplished, and, at the same time, the electrical connection between the cartridges is also accomplished, whereby the assembly of the cartridges is easily accomplished, and the risk of short circuits is prevented during the assembly or the use of the cartridges. Furthermore, a middle- or large-sized battery pack manufactured using the battery cartridge according to the present invention has a stable compact structure. Consequently, the middle- or large-sized battery pack is preferably used as a power source for electric vehicles or hybrid electric vehicles.

What is claimed is:

1. A battery cartridge, comprising:
    a first frame member defining a first through opening and a second through opening;
    a second frame member;
    an electrically conductive socket connecting member interposed between the first frame member and the second frame member, the socket connecting member comprising a socket, which is aligned with the first through opening, and a connection part protruding from one side of the socket connecting member; and
    an electrically conductive plug connecting member interposed between the first frame member and the second frame member, the plug connecting member comprising a protrusion, which protrudes through the second through opening,
    the socket and the plug connecting members configured for electrically connecting and mechanically coupling adjacent battery cartridges, and
    wherein the socket and plug connecting members of adjacent battery cartridges are coupled with each other when the adjacent battery cartridges are stacked.

2. The battery cartridge according to claim 1, wherein the first frame member and the second frame member fix edges of a unit cell mounted between the first frame and the second frame when the frame members are coupled with each other, the unit cell arranged in a lateral direction, and bus bars, for connecting electrode terminals of the unit cell, are attached to an upper end frame of the battery cartridge.

3. The battery cartridge according to claim 1, wherein
    the connection part of the socket connecting member is connected to an electrode terminal of a corresponding unit cell, and
    the plug connecting member further comprises a connection part, which is connected to an electrode terminal of a corresponding unit cell, the connection part of the plug connecting member protruding from one side of the plug connecting member, and
    wherein the protrusion of the plug connecting member is coupled with a socket of an adjacent battery cartridge when battery cartridges are stacked.

4. The battery cartridge according to claim 1, wherein the connecting members are integrally formed with the cartridge or assembled with the cartridge.

5. The battery cartridge according to claim 4, wherein the connecting members are fixedly mounted between the first and second frame members, and at least one of the protrusion and the socket are exposed to the outside.

6. The battery cartridge according to claim 2, wherein the frame members are provided at either side thereof with at least one coupling protrusion, the coupling protrusion comprising a through-hole disposed such that a rod-shaped coupling member can be inserted through the through-hole so as to increase a coupling force between adjacent cartridges.

7. The battery cartridge according to claim 1, further comprising lithium secondary batteries mounted between the first frame and the second frame.

8. The battery cartridge according to claim 1, further comprising pouch-shaped batteries mounted between the first frame and the second frame.

9. A battery module, comprising:
    a plurality of battery cartridges according to claim 1, the battery cartridges stacked one on another and mechanically coupled and electrically connected by the socket and plug connecting members,
    a cover plate, which has a shape corresponding to the battery cartridges, the cover plate mounted on an uppermost battery cartridge, and
    a base plate, which has a shape corresponding to the battery cartridges, the base plate mounted on a lowermost battery cartridge,
    wherein the cover plate and the base plate have a coupling groove or a coupling protrusion, which can couple with the protrusion or the socket of the connecting members, respectively, the cover plate and the base plate each also having an external input and output terminal, which is electrically connected with the coupling groove or the coupling protrusion, respectively.

10. The battery module according to claim 9, wherein each of the battery cartridges is provided at one side of an upper end thereof with a socket connecting member and at one side of a lower end thereof with a plug connecting member.

11. A middle- or large-sized battery pack including one or more battery modules according to claim 9.

12. The battery pack according to claim 11, wherein the battery pack is used as a power source for electric vehicles or hybrid electric vehicles.

* * * * *